US011356194B2

(12) United States Patent
Kondo

(10) Patent No.: US 11,356,194 B2
(45) Date of Patent: Jun. 7, 2022

(54) COMMUNICATION SYSTEM USING WIRED TRANSMISSION LINE AND MULTI-CARRIER MODULATION

(71) Applicant: MegaChips Corporation, Osaka (JP)

(72) Inventor: Taiji Kondo, Chiba (JP)

(73) Assignee: MEGACHIPS CORPORATION, Osaka (JP)

( * ) Notice: Subject to any disclaimer, the term of this patent is extended or adjusted under 35 U.S.C. 154(b) by 0 days.

(21) Appl. No.: 16/979,978

(22) PCT Filed: Mar. 12, 2019

(86) PCT No.: PCT/JP2019/009965
§ 371 (c)(1),
(2) Date: Sep. 11, 2020

(87) PCT Pub. No.: WO2019/176931
PCT Pub. Date: Sep. 19, 2019

(65) Prior Publication Data
US 2021/0013993 A1 Jan. 14, 2021

Related U.S. Application Data

(60) Provisional application No. 62/642,432, filed on Mar. 13, 2018.

(51) Int. Cl.
*G08C 17/00* (2006.01)
*H04L 1/00* (2006.01)
(Continued)

(52) U.S. Cl.
CPC ......... *H04L 1/0005* (2013.01); *H04B 17/336* (2015.01); *H04L 1/0011* (2013.01); *H04L 27/2601* (2013.01); *H04W 52/241* (2013.01)

(58) Field of Classification Search
None
See application file for complete search history.

(56) References Cited

U.S. PATENT DOCUMENTS 10,491,261 B1\* 11/2019 Al-Eidan ............ H04L 27/2649
2005/0078803 A1 4/2005 Wakisaka et al.
(Continued)

FOREIGN PATENT DOCUMENTS

JP 2006-319900 A 11/2006
JP 2007-506349 A 3/2007
(Continued)

OTHER PUBLICATIONS

International Search Report and Written Opinion dated May 7, 2019 for PCT/JP2019/009965 filed on Mar. 12, 2019, 10 pages including English Translation of the International Search Report.
(Continued)

*Primary Examiner* — Gerald A Smarth
(74) *Attorney, Agent, or Firm* — Xsensus LLP

(57) ABSTRACT

A communication system that uses a wired transmission line and multi-carrier modulation includes a transmitting device and a receiving device that are connected through the wired transmission line, wherein the receiving device includes an estimator configured to estimate a first SINR (Signal-to-Interference-Plus-Noise Ratio) of a first sub-carrier and a second SINR of a second sub-carrier, the transmitting device includes a power adjustor configured to boost a transmission power for the first sub-carrier such that an SINR of the first sub-carrier reaches a first SINR threshold corresponding to a first MCS (Modulation and Coding Scheme) that is larger than the first SINR, and back off a transmission power for the second sub-carrier such that an SINR of the second sub-carrier is lowered to a second SINR threshold corresponding to a second MCS that is smaller than the second
(Continued)

SINR, and the transmitting device allocates the first MCS to the first sub-carrier.

11 Claims, 13 Drawing Sheets

(51) Int. Cl.
*H04B 17/336* (2015.01)
*H04L 27/26* (2006.01)
*H04W 52/24* (2009.01)

(56) References Cited

U.S. PATENT DOCUMENTS

| | | | |
|---|---|---|---|
| 2006/0094372 A1* | 5/2006 | Ahn | H04L 1/0009 455/67.13 |
| 2006/0209890 A1* | 9/2006 | MacMullan | H04W 92/00 370/468 |
| 2006/0268976 A1* | 11/2006 | Baum | H04L 27/0008 375/239 |
| 2007/0230599 A1 | 10/2007 | Koga et al. | |
| 2007/0298728 A1 | 12/2007 | Imamura et al. | |
| 2010/0035645 A1* | 2/2010 | Chang | H04W 52/241 455/522 |
| 2012/0057471 A1* | 3/2012 | Amini | H04L 27/0002 370/242 |
| 2013/0003687 A1* | 1/2013 | Woodley | H04L 5/0091 370/329 |
| 2015/0023438 A1 | 1/2015 | Takata et al. | |
| 2017/0019148 A1* | 1/2017 | Williams | G01S 13/06 |

FOREIGN PATENT DOCUMENTS

| | | |
|---|---|---|
| JP | 2014-093677 A | 5/2014 |
| JP | 2016-192632 A | 11/2016 |
| WO | 2005/015770 A1 | 2/2005 |
| WO | 2006/028204 A1 | 3/2006 |
| WO | 2013/129038 A1 | 9/2013 |

OTHER PUBLICATIONS

Extended European Search Report dated Mar. 22, 2021 in corresponding European Patent Application 19768160.4.
Atya Ahmed Osama Fathy et at: "Mitigating Malicious Interference Via Subcarrier-level Radio Agility in Wireless Networks", 2013 21st IEEE International Conference on Network Protocols (ICNP), IEEE, Oct. 7, 2013, pp. 1-10.
Singh Shailendra et al: "Adaptive Sub-Carrier Level Power Allocation in OFDMA Networks" IEEE Transactions on Mobile Computing, IEEE Service Center, Los Alamitos, CA, US, vol. 14, No. 1, Jan. 1, 2015, pp. 28-41.
Office Action dated Nov. 19, 2021, in corresponding European patent Application No. 19768160.4, 6 pages.
Hariharan Rahul et al., "Frequency-Aware Rate Adaptation and MAC Protocols", pp. 193-204, National Lab for Information Science and Technology/ MobiCom'09, ACM, Sep. 20, 2009, Beijing, China, XP058288607, ISBN: 978-1-60558-702-8.

* cited by examiner

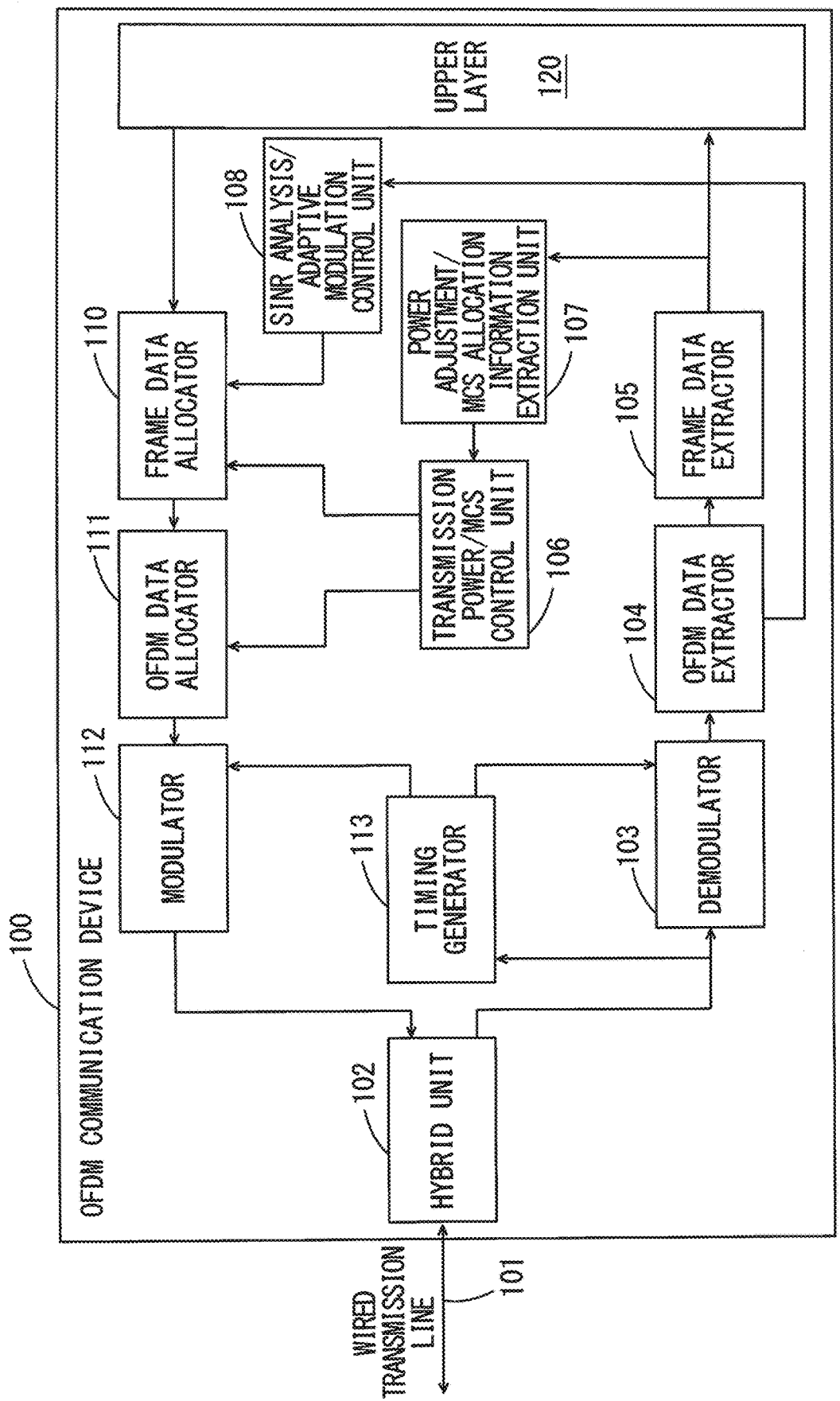
F I G. 9

COMMUNICATION SYSTEM USING WIRED TRANSMISSION LINE AND MULTI-CARRIER MODULATION

CROSS-REFERENCE TO RELATED APPLICATIONS

The present application is based on PCT filing PCT/JP2019/009965, filed Mar. 12, 2019, which claims priority to U.S. Provisional Application No. 62/642,432, filed Mar. 13, 2018, the entire contents of each are incorporated herein by reference.

TECHNICAL FIELD

The present invention relates to a communication system using a wired transmission line. More specifically, the present invention relates to a communication system using multi-carrier modulation including a plurality of sub-carriers in a network environment in which a wired transmission line is used.

BACKGROUND ART

The OFDM (Orthogonal Frequency-Division Multiplexing) is a transmission technique that divides a communication channel into frequency bands (sub-carriers) each bandwidth of which is the same. Further, the OFDM is known as a technique which realizes both of high noise resistance and high data transmission speed. In Patent Document mentioned below, a technique relating to wireless OFDM is disclosed.

[Patent Document 1] JP 2016-192632 A

Transmission properties are generally affected by a noise signal, a transmission distance, a transmitter/receiver performance etc. Nevertheless, in wired communications in a factory automation system and an automotive system, stable and efficient signal transmission properties are required even under harsh transmission environments. In an automotive system such as a Hybrid Electric Vehicle (HEV) and an Electric Vehicle (EV), a high-output electric current flows through wire harnesses connected to an inverter or a motor, and electromagnetic noise that is generated then makes a transmission environment even harsher. Furthermore, as a deterioration of transmission properties peculiar to wired transmission lines such as wire harnesses, the so-called "suck out" is known.

SUMMARY OF INVENTION

Technical Problem

FIG. 1 is a diagram illustrating the power spectrum of the OFDM. As illustrated in FIG. 1, in the case of a multi-carrier modulation system such as the OFDM, a transmission is performed through a band in which a plurality of sub-carriers with narrow bandwidths are bundled. The transmission device transmits transmission data through sub-carriers all having same transmission powers (electric powers). Wider bandwidths for the transmission are provided in accordance with an increase of the number of sub-carriers. On the other hand, as illustrated in FIG. 2, a frequency property of a wired transmission line (e.g. harness, cable) is deteriorated along with higher frequency. Therefore, a power loss in transmission power in the wired transmission line is increased with higher frequency.

FIG. 3 is a diagram illustrating the power spectrum of the OFDM using a harness. In a case where the sub-carrier of the OFDM illustrated in FIG. 1 uses the wired transmission line having the frequency property illustrated in FIG. 2 for a transmission, the sub-carriers in the high frequencies will have a deteriorated SINR (Signal-to-Interference-Plus-Noise Ratio) as illustrated in FIG. 3.

An object of the present invention is to perform a signal transmission adjusted to a transmission property of a wired transmission line in a communication system using the wired transmission line and multi-carrier modulation.

While the object of the present invention is as described above, an incidental problem that may arise in the present embodiment will be described. FIG. 4 is a diagram illustrating a receiving property of a communication device and illustrating the relationship between SINR and BER in regard to BPSK (Binary Phase shift Keying) and QPSK (Quadrature Phase shift Keying). A target BER (Bit Error Rate) is set as a value required in the communication device. As illustrated in FIG. 4, an SINR satisfying the target BER differs depending on an MCS (Modulation and Coding Scheme). That is, an SINR required to reach the same target BER is higher for QPSK than for BPSK.

FIG. 5 is a diagram illustrating a receiving property of communication devices A, B and illustrating the relationship between an SINR and a BER in regard to the communication devices A, B. As illustrated in FIG. 5, even in a case where the same MCS is applied, the communication devices have different receiving properties. That is, even in a case where BPSK is used as a Modulation Coding Scheme for both of the communication devices A, B, the SINR required to reach the same target BER is higher for the communication device B than for the communication device A. This is because the receiving property is also affected by a noise value generated from the communication device itself.

In a case where an SINR is estimated based on the length of the wired transmission line (e.g. harness, cable), the MCS which satisfies the target BER is determined based on a communication device having a low receiving property. FIG. 6 is a diagram illustrating the relationship between SINR and BER in regard to the communication devices A, B. As illustrated in FIG. 6, in regard to the estimated SINR, the BER of the communication device A does not only reach the target BER in the BPSK transmission but also reaches the target BER in the QPSK transmission. On the other hand, in regard to the estimated SINR, while reaching the target BER in the BPSK transmission, the BER of the communication device B does not reach the target BER in the QPSK transmission. In a case where a communication device X communicates with the communication devices A, B in the multi-carrier modulation system using such a wired transmission line, because the communication device X does not know receiving properties of the communication devices A, B in advance, BPSK is selected based on the communication device B having a low receiving property for the communication between the communication devices X, A and the communication between the communication devices X, B. That is, although QPSK can be used for the communication with the communication device A, the communication device X performs communication using the BPSK in accordance with the communication device B having a low receiving property.

An incidental object of the present embodiment is to effectively use a receiving property of each communication device in a communication system using a wired transmission line and multi-carrier modulation.

Solution to Problem (1) A communication system that uses a wired transmission line and multi-carrier modulation according to one aspect of the present invention includes a transmitting device and a receiving device that are connected to each other through the wired transmission line, wherein the receiving device includes an estimator that estimates a first SINR (Signal-to-Interference-Plus-Noise Ratio) of a first sub-carrier and a second SINR of a second sub-carrier, the transmitting device includes a power adjustor that boosts a transmission power for the first sub-carrier such that an SINR of the first sub-carrier reaches a first SINR threshold corresponding to a first MCS (Modulation and Coding Scheme) that is larger than the first SINR, and backs off a transmission power for the second sub-carrier such that an SINR of the second sub-carrier is lowered to a second SINR threshold corresponding to a second MCS that is smaller than the second SINR, and the transmitting device allocates the first MCS to the first sub-carrier.

Here, an SINR threshold refers to an SINR threshold for BPSK, an SINR threshold for QPSK and the like illustrated in FIG. 18. Each MCS such as BPSK and QPSK has a range of SINR in which an expected BER can be obtained in a case where each MCS is allocated. The range of SINR in which the expected BER is obtained in a case where BPSK is allocated in FIG. 18 is between the SINR threshold for BPSK and the SINR threshold for QPSK. The SINR threshold corresponding to each MCS represents a lower limit of the range.

In the communication system using the wired transmission line and the multi-carrier modulation, a signal transmission adjusted to the transmission property of the wired transmission line can be carried out.

(2) The power adjustor may back off the transmission power for the second sub-carrier and then boost the transmission power for the first sub-carrier, thereby allocating the backed-off transmission power for the second sub-carrier to the first sub-carrier. Thus, the transmission power that has been backed off for the second sub-carrier can be effectively used.

(3) The power adjustor may back off transmission powers for a plurality of the second sub-carriers, then accumulate the backed-off transmission powers for the plurality of the second sub-carriers and boost transmission powers for one or a plurality of the first sub-carriers, thereby allocating an accumulation value of the backed off transmission powers for the plurality of the second sub-carriers to the one or plurality of the first sub-carriers. Thus, the transmission power that has been backed off for the second sub-carrier can be effectively used. The transmission power can be effectively used in the range of the regulation of a total transmission power.

(4) The MCS may include at least one modulation and coding scheme selected from a group consisting of 256 QAM, 64 QAM, 16 QAM, QPSK and BPSK.

(5) The receiving device may include an allocator that allocates the MCS which satisfies a target Bit Error Rate (BER) to each sub-carrier based on an SINR estimated in regard to each sub-carrier, and a transmitter that transmits an allocation information of the MCS that is allocated to each sub-carrier to the transmitting device.

It is possible to control allocation of a most suitable MCS in consideration of the receiving device and the difference in performance by allocating an MCS to each sub-carrier in the receiving device. In the communication system using the wired transmission line and the multi-carrier modulation, a receiving property of each communication device can be effectively used.

(6) The transmitting device may dynamically boost the transmission power for the first sub-carrier. A transmission power can be dynamically adjusted in accordance with a transmission property.

(7) The transmitting device may dynamically back off the transmission power for the second sub-carrier. A transmission power can be dynamically adjusted in accordance with a transmission property.

(8) The wired transmission line, the receiving device and the transmitting device are provided in an automobile or a vehicle with a motor. In vehicle system using multi-carrier modulation, for example, a signal transmission adjusted to a transmission property of the wired transmission line can be carried out.

Advantageous Effects of Invention

The present invention enables the signal transmission adjusted to the transmission property of the wired transmission line in the communication system using the wired transmission line and the multi-carrier modulation.

BRIEF DESCRIPTION OF THE DRAWINGS

FIG. 9 is a block diagram of an OFDM communication device included in the communication system according to an embodiment.

DESCRIPTION OF EMBODIMENTS

[1] Overall Configuration of Communication System

A communication system of the present embodiment is a communication system that uses a wired transmission line and multi-carrier modulation.

Figure 7:
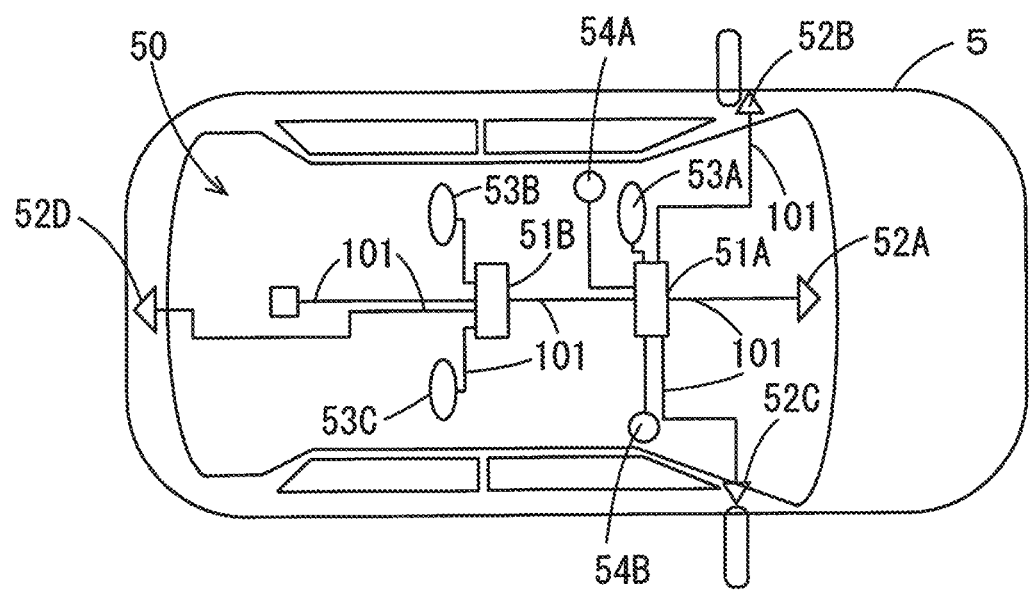
FIG. 7 is a diagram illustrating a communication system provided in a vehicle.

FIG. 7 is a diagram illustrating a vehicle 5 in which the communication system 50 of the present embodiment is provided. The communication system 50 includes Electronic Control Units (ECU) 51A, 51B, camera units 52A, 52B, 52C, 52D, liquid crystal units 53A, 53B, 53C and speaker units 54A, 54B.

These units 51A, 51B, 52A to 52D, 53A to 53C, 54A, 54B are all connected by the wired transmission line 101. For example, an Ethernet cable using STP or UTP based on IEEE 802.3 standard is used as the wired transmission line 101. Further, each of the units 51A, 51B, 52A to 52D, 53A to 53C, 54A, 54B includes an OFDM communication device that uses an OFDM (orthogonal frequency-division multiplexing) transmission technique for performing multi-carrier modulation.

Figure 8:
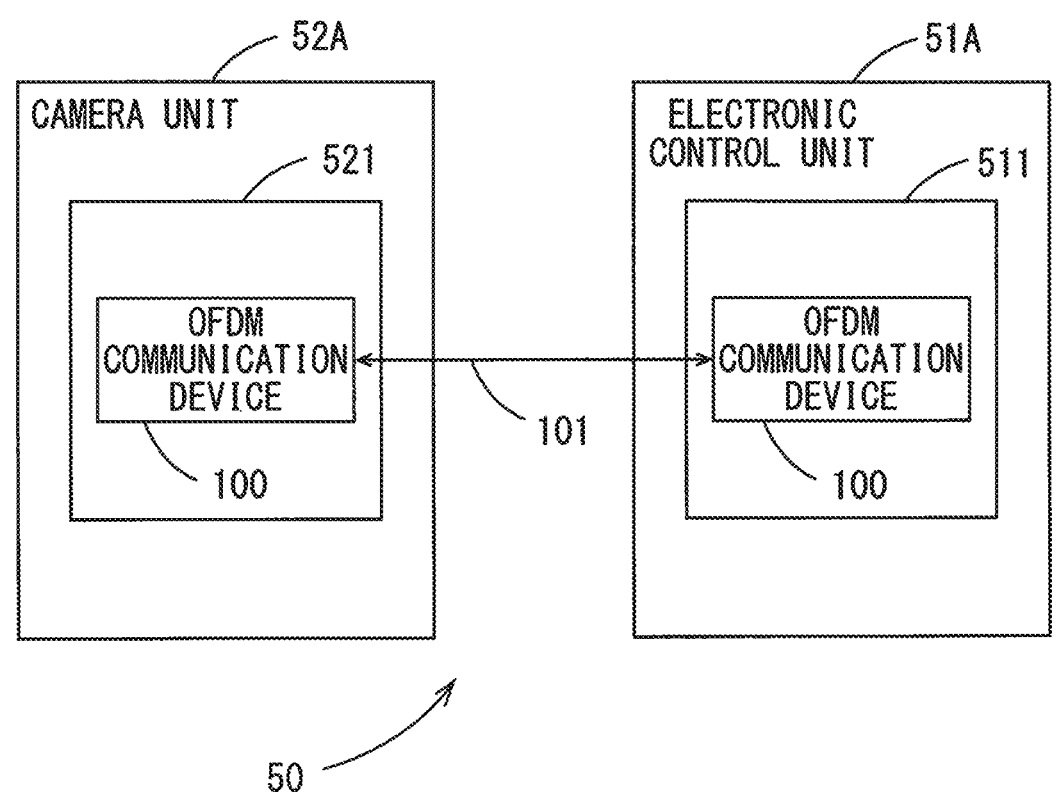
FIG. 8 is a block diagram of a unit included in the communication system.

FIG. 8 is a diagram illustrating the communication between the electronic control unit 51A and the camera unit 52A in the communication system 50 according to the present embodiment. The electronic control unit 51A includes an ECU substrate 511. The OFDM communication device 100 is mounted on the ECU substrate 511. The camera unit 52A includes a camera control substrate 521. The OFDM communication device 100 is mounted on the camera control substrate 521. In this manner, the electronic control unit 51A and the camera unit 52A respectively include the OFDM communication devices 100. The electronic control unit 51A and the camera unit 52A are connected to each other by the wired transmission line 101. All of the other units illustrated in FIG. 7 also include the OFDM communication devices 100 and perform an OFDM transmission through the wired transmission line 101. In this manner, the communication system 50 of the present embodiment uses the wired transmission line 101 and the multi-carrier modulation. Specifically, the communication system 50 of the present embodiment uses the OFDM communication in a vehicle network.

As described below, an OFDM communication device 100 that operates as a receiving device in the present embodiment transmits a difference information with respect to an SINR threshold (Signal-to-Interference-Plus-Noise Ratio) and an MCS (Modulation and Coding Scheme) allocation information to an OFDM communication device 100 that operates as a transmitting device through the wired transmission line 101. The OFDM communication device 100 that operates as the transmitting device adjusts a transmission power for each sub-carrier based on the received difference information with respect to an SINR threshold. Further, the OFDM communication device 100 that operates as the transmitting device allocates a designated MCS to each sub-carrier based on the received MCS allocation information.

[2] Overall Configuration and Operational Flow of OFDM Communication Device

FIG. 9 is a block diagram of the OFDM communication device 100 used in the communication system 50 according to the embodiment. The OFDM communication device 100 is connected to a counter device (not shown) through the wired transmission line 101. The counter device has the configuration and functions similar to those of the OFDM communication device 100. That is, the two OFDM communication devices 100 communicate with each other as illustrated in FIG. 8.

The entire configuration of the OFDM communication device 100 will be described. The OFDM communication device 100 includes a hybrid unit 102, a demodulator 103, an OFDM data extractor 104, a frame data extractor 105, a transmission power/MCS control unit 106, a power adjustment/MCS allocation information extraction unit 107, an SINR analysis/Adaptive modulation control unit 108, a frame data allocator 110, an OFDM data allocator 111, a modulator 112, a timing generator 113 and an upper layer 120. These functions 102 to 108, 110 to 113, 120 are constituted by hardware. However, as described below, part or all of these functions may be realized by software.

The hybrid unit 102 transmits an OFDM signal to the OFDM communication device 100 which is the counter device through the wired transmission line 101. The hybrid unit 102 receives an OFDM signal from the OFDM communication device 100 which is the counter device through the wired transmission line 101. The hybrid unit 102 performs a process of superimposing transmission signals and a process of separating receipt signals. The demodulator 103 demodulates an OFDM receipt signal from a receipt signal outputted from the hybrid unit 102 based on a timing information generated by the timing generator 113. The demodulator 103 demodulates the OFDM receipt signal by performing FFT (Fast Fourier Transform). The OFDM data extractor 104 extracts an information of a sub-carrier from the OFDM receipt signal. The information of a sub-carrier extracted by the OFDM data extractor 104 is supplied to the SINR analysis/Adaptive modulation control unit 108. Further, the frame data extractor 105 extracts frame data and a control frame.

The frame data extracted from the information of a sub-carrier by the frame data extractor 105 is supplied to the upper layer 120. The upper layer 120 receives the frame data and executes various application processes. The control frame extracted by the frame data extractor 105 is also supplied to the power adjustment/MCS allocation information extraction unit 107.

The power adjustment/MCS allocation information extraction unit 107 extracts a difference information with respect to an SINR threshold and an MSC allocation information from the control frame extracted by the frame data extractor 105. The difference information with respect to an SINR threshold and the MCS allocation information are the informations stored in the control frame by the OFDM communication device 100 which is the counter device. The difference information with respect to an SINR threshold is used for adjustment of a transmission power. The process flow of the power adjustment/MCS allocation information extraction unit 107 will be described below in detail.

The transmission power/MCS control unit 106 controls a transmission power (electric power) for a sub-carrier when frame data is allocated to the sub-carrier, modulated and coded. The process flow of the transmission power/MCS control unit 106 will be described below in detail.

The SINR analysis/Adaptive modulation control unit 108 analyzes an SINR based on an OFDM receipt signal. The SINR indicates the quality of a receipt signal and has a property that deteriorates due to interferences and noises. The SINR analysis/Adaptive modulation control unit 108 calculates the difference between an SINR threshold and a receipt SINR for each sub-carrier. Further, the SINR analysis/Adaptive modulation control unit 108 determines an MCS to be recommended to the counter communication device (the OFDM communication device 100). The MCS to be recommended to the counter communication device (the OFDM communication device 100) is generated as an MCS allocation information. The process flow of the SINR Analysis/Adaptive Modulation Control Unit 108 will be described below in detail.

The frame data allocator 110 converts the difference information with respect to the SINR threshold and the MCS allocation information into the control data. The frame data allocator 110 stores the converted control data in the control frame and allocates the converted control data to a sub-carrier. The OFDM data allocator 111 generates an OFDM transmission signal by modulating and coding a sub-carrier information outputted from the frame data allocator 110. The modulator 112 modulates the OFDM transmission signal based on the timing information generated by the timing generator 113. The modulator 112 modulates the OFDM transmission signal by performing IFFT (Inverse Fast Fourier Transform). The modulated OFDM transmission signal is transmitted to the OFDM communication device 100 which is the counter communication terminal through the wired transmission line 101.

Meanwhile, the OFDM communication device 100 which is the counter communication terminal performs the similar process. The OFDM communication device 100 which is the counter communication terminal stores the difference information with respect to the SINR threshold and the MCS allocation information in the OFDM transmission signal using the method similar to the above-mentioned method. Further, the OFDM communication device 100 which is the counter communication terminal transmits the OFDM signal storing the difference information with respect to the SINR threshold and the MCS allocation information.

[3] Process Flow of SINR Analysis/Adaptive Modulation Control Unit

Figure 10:
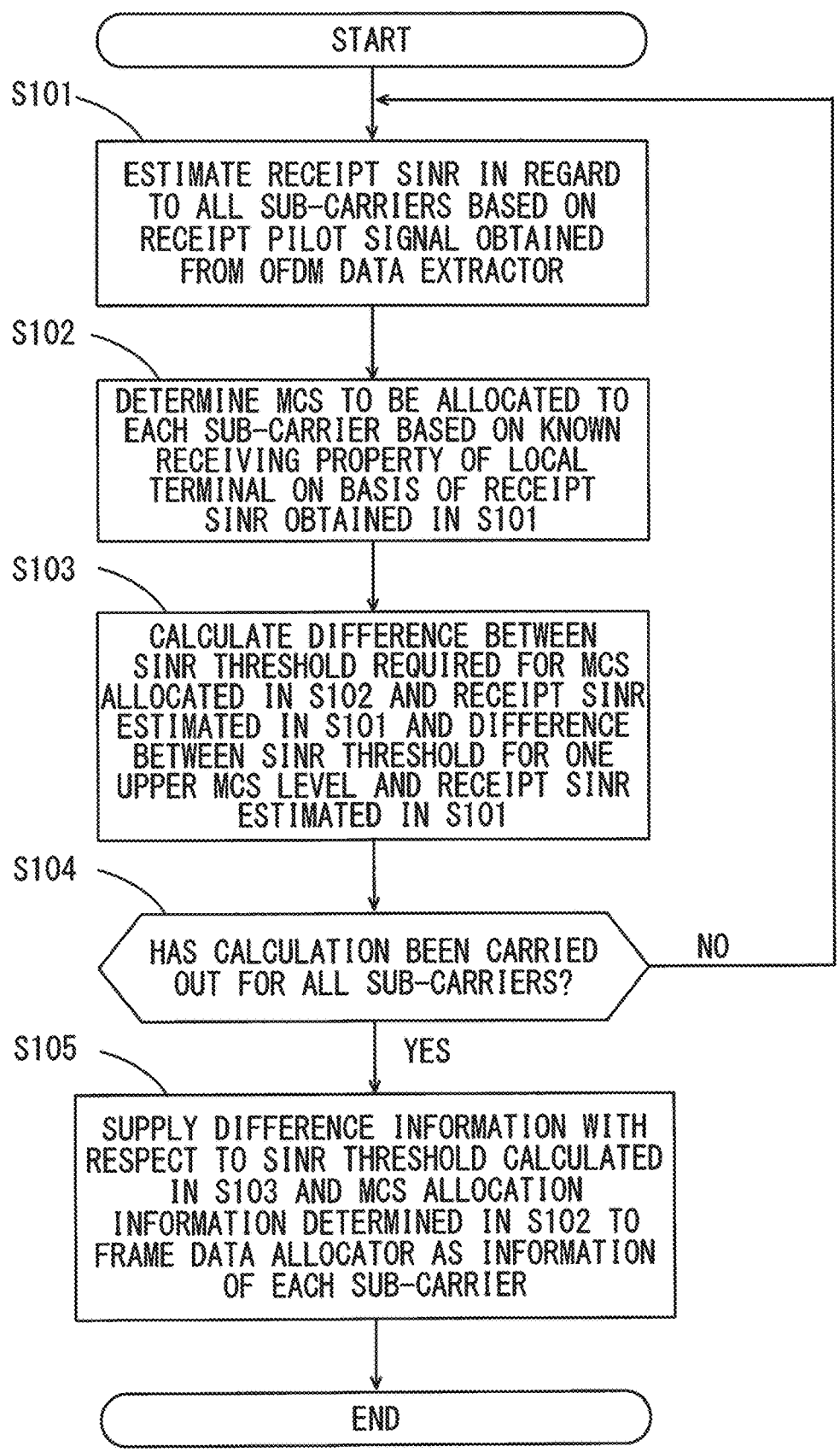
FIG. 10 is a flowchart illustrating the process flow of an SINR analysis/Adaptive modulation control unit.

FIG. 10 is a flowchart illustrating the process flow of the SINR analysis/Adaptive modulation control unit 108. The SINR analysis/Adaptive Modulation Control Unit 108 acquires an information of a receipt pilot signal extracted by the OFDM data extractor 104. Then, the SINR analysis/Adaptive modulation control unit 108 estimates a receipt SINR in regard to all sub-carriers based on the receipt pilot signal (step S101). That is, the SINR analysis/Adaptive modulation control unit 108 calculates the estimated SINR in regard to each sub-carrier. A known pilot signal is embedded in each sub-carrier of the OFDM receipt signal. The SINR analysis/Adaptive modulation control unit 108 can estimate receipt SINRs in regard to all sub-carriers by comparing the phase and amplitude of the receipt pilot signal with a known phase and a known amplitude.

Figure 1:
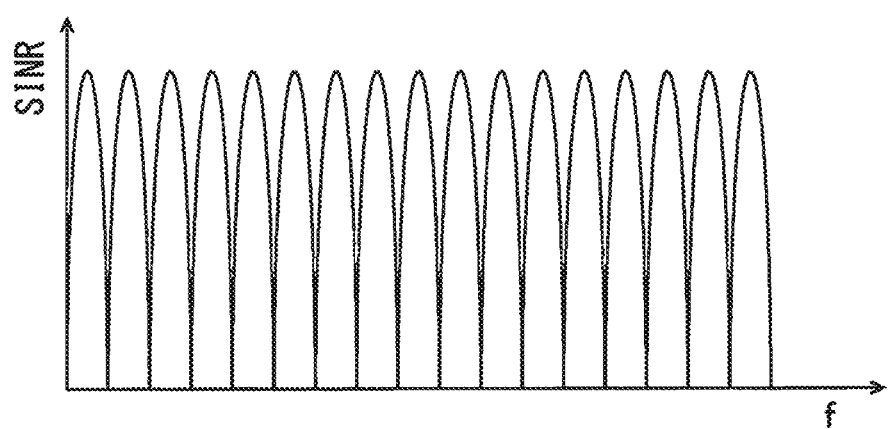
FIG. 1 is a diagram illustrating the power spectrum of the OFDM.
Figure 2:
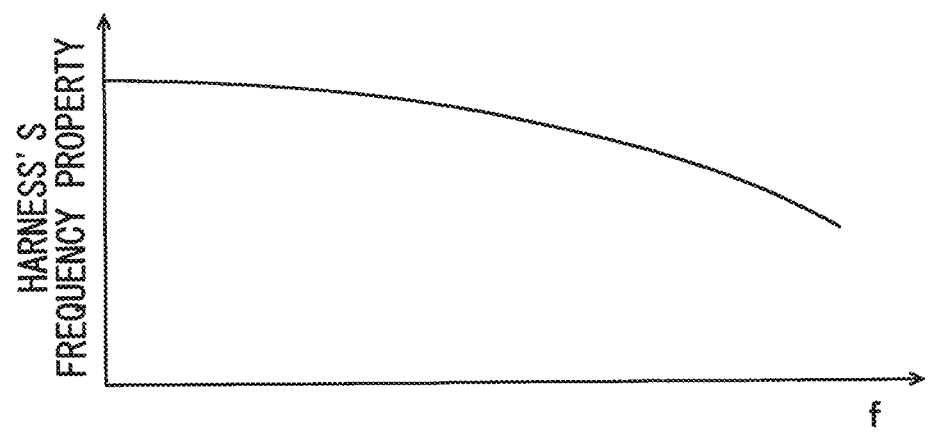
FIG. 2 is a diagram illustrating a harness's frequency property.
Figure 3:
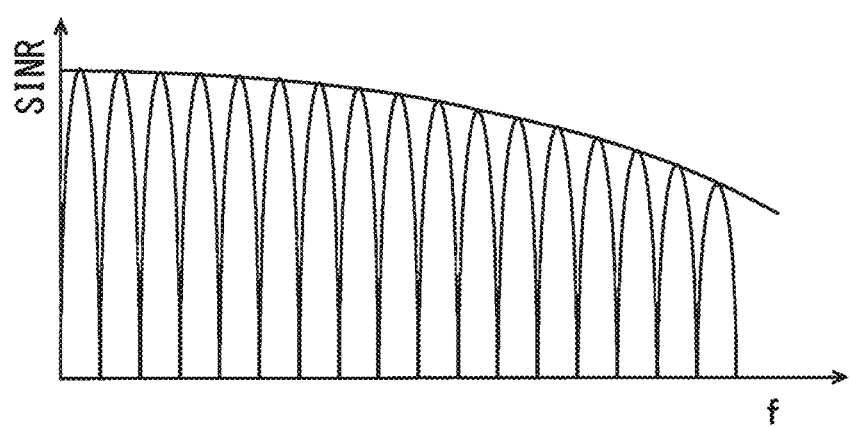
FIG. 3 is a diagram illustrating the power spectrum of the OFDM using a harness.
Figure 4:
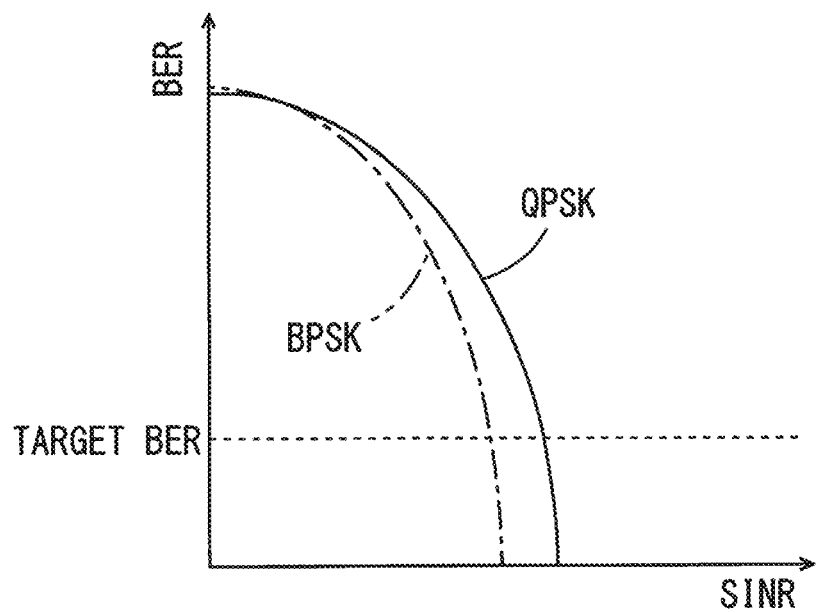
FIG. 4 is a diagram illustrating the relationship between BER and SINR in regard to BPSK and QPSK.
Figure 5:
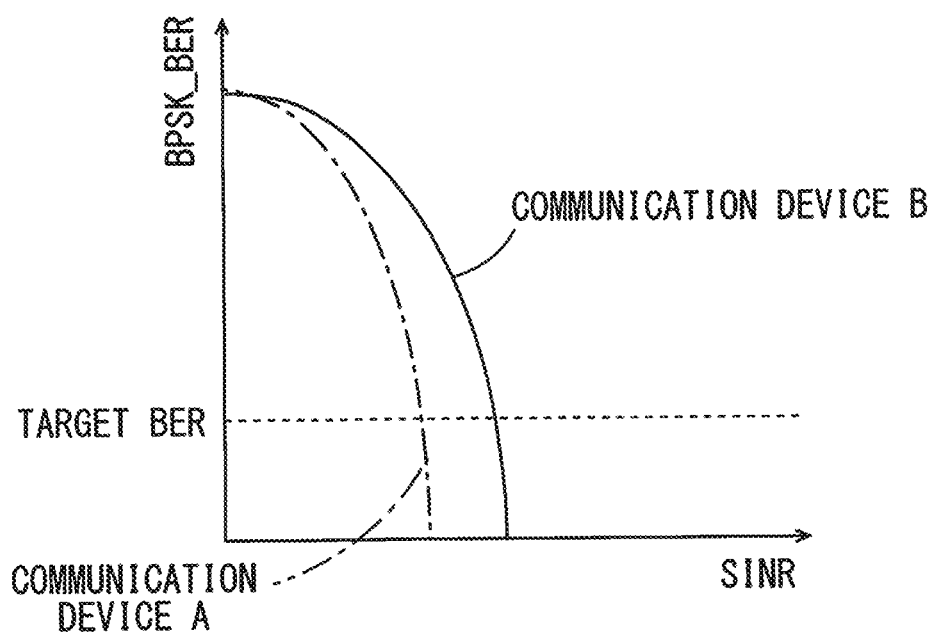
FIG. 5 is a diagram illustrating the relationship between BER and SINR in regard to communication devices A, B.
Figure 6:
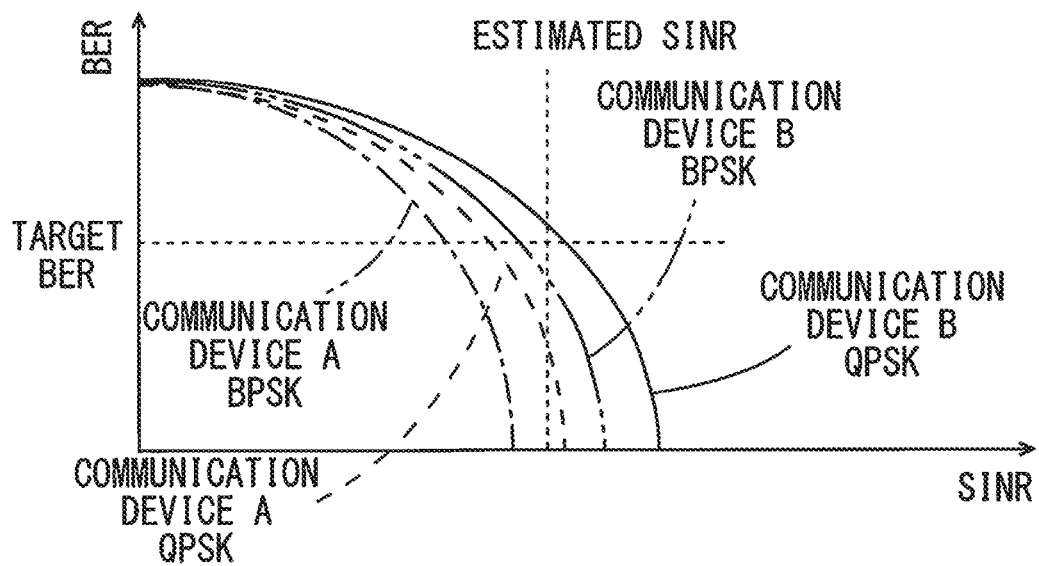
FIG. 6 is a diagram illustrating the relationship between SINR and BER between the communication devices A, B.

Next, the SINR analysis/Adaptive modulation control unit 108 determines an MCS to be allocated to each sub-carrier based on the known receiving property of the local terminal and the receipt SINR obtained in the step S101 (step 102). The SINR analysis/Adaptive modulation control unit 108 has a correspondence table of SINR and a target BER in the local terminal as illustrated in FIG. 4. This correspondence table represents the receiving property of the local terminal. Further, the target BER is set in advance by the SINR analysis/Adaptive modulation control unit 108. The SINR analysis/Adaptive modulation control unit 108 can determine a suitable MCS for each sub-carrier by making reference to the correspondence table and the supplied target BER. Specifically, the MCS which satisfies the target BER on the receipt SINR (estimated SINR) obtained in the step S101 is determined for each sub-carrier. The SINR analysis/Adaptive modulation control unit 108 determines the MCS which satisfies the target BER and generates an MCS allocation information for each sub-carrier.

Next, the SINR analysis/Adaptive modulation control unit 108 calculates the difference between the SINR threshold required for the MCS allocated in the step S102 and the receipt SINR estimated in the step S101 in regard to each sub-carrier. Further, the SINR analysis/Adaptive modulation control unit 108 calculates the difference between the SINR threshold for the MCS that is one level higher than the MCS allocated in the step S102 and the receipt SINR estimated in the step S101 in regard to each sub-carrier (step S103).

Figure 14:
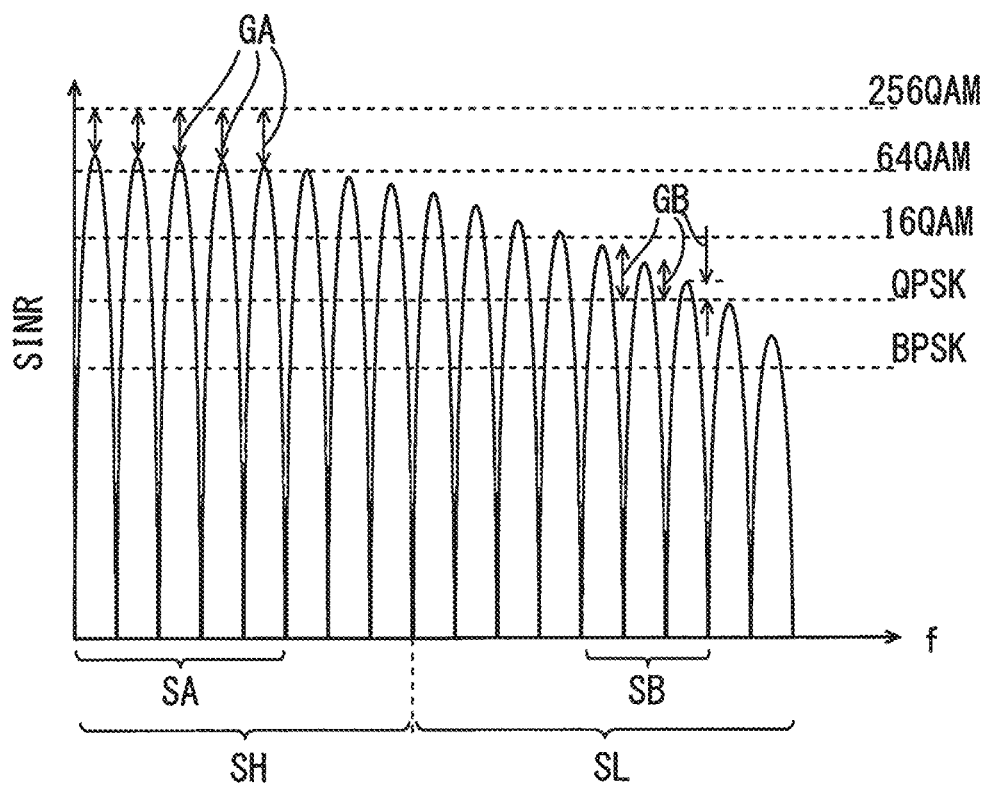
FIG. 14 is a diagram illustrating a gap between an SINR threshold and an SINR for each sub-carrier.

FIG. 14 is a diagram illustrating the gap between the SINR threshold and the receipt SINR for each sub-carrier. As for the sub-carriers that belong to a frequency range SA among the sub-carriers transmitting the OFDM receipt signals and are illustrated in FIG. 14, the receipt SINR is larger than the SINR threshold of 64 QAM (64 Quadrature Amplitude Modulation). However, as for the sub-carriers that belong to the frequency range SA, the receipt SINR is lower than the SINR threshold of 256 QAM (256 Quadrature Amplitude Modulation). Therefore, the SINR analysis/Adaptive modulation control unit 108 determines the allocation of 64 QAM as the MCS of the sub-carriers that belong to the frequency range SA in the step S102.

As for the sub-carriers that belong to a frequency range SB among the sub-carriers transmitting the OFDM receipt signals and are illustrated in FIG. 14, the receipt SINR is larger than the SINR threshold of QPSK (Quadrature Phase shift Keying). However, as for the sub-carriers that belong to the frequency range SB, the receipt SINR is smaller than the SINR threshold of 16 QAM (16 Quadrature Amplitude Modulation). Therefore, the SINR analysis/Adaptive modulation control unit 108 determines the allocation of QPSK as the MCS of the sub-carriers that belong to the frequency range SB in the step S102. With a similar method, BPSK (Binary Phase shift Keying) is allocated to the sub-carriers that belong to a frequency range higher than the frequency range SB as the MCS.

Then, as described above, the SINR analysis/Adaptive modulation control unit 108 calculates the difference between the SINR threshold required for the MCS allocated in the step S102 and the receipt SINR obtained in the step S101. For example, the gaps GB in FIG. 14 indicate the differences between the SINR threshold for QPSK allocated to the sub-carriers in the frequency range SB and the receipt SINRs.

Further, as described above, the SINR analysis/Adaptive modulation control unit 108 calculates the difference between the SINR threshold for the MCS that is one level higher than the MCS allocated in the step S102 and the receipt SINR obtained in the step S101. For example, the gaps GA in FIG. 14 indicate the differences between the SINR threshold for 256 QAM which is one upper MCS level from 64 QAM allocated to the sub-carriers in the frequency range SA and the receipt SINRs.

While the differences between the SINR threshold required for the MCS allocated in the step S102 (that is, 64 QAM) and the receipt SINRs obtained in the step S101 are not illustrated in regard to the frequency range SA in FIG. 14, the differences are also obtained similarly in regard to the frequency range SA. Further, while the differences between the SINR threshold for the MCS (that is, 16 QAM) that is one level higher than the MCS allocated in the step S102 and the receipt SINRs obtained in the step S101 are not shown in regard to the frequency range SB in FIG. 14, the differences are obtained similarly in regard to the frequency range SB. That is, in regard to all sub-carriers, the differences between the SINR thresholds required for the allocated MCSs and the receipt SINRs, and the differences between the SINR thresholds for the upper MCS levels and the receipt SINRs are obtained.

Next, the SINR analysis/Adaptive modulation control unit 108 determines whether calculation of the step S103 has been carried out in regard to all sub-carriers (step S104). In a case where the calculation of the step S103 has not been carried out in regard to all of the sub-carriers, the process returns to the step S101, and the process of the steps S101 to the step S103 is performed in regard to the next sub-carrier. In a case where the calculation in the step S103 has been carried out for all of the sub-carriers, the process proceeds to the step S105 in the SINR analysis/Adaptive modulation control unit 108.

Next, the SINR analysis/Adaptive modulation control unit 108 supplies the MCS allocation information determined in the step S102 and the difference information in regard to an SINR threshold that is calculated in the step S103 to the frame data allocator 110 as an information of each sub-carrier. As described above, the difference information in regard to an SINR threshold includes the difference between an SINR threshold required for the allocated MCS and a receipt SINR and the difference between an SINR threshold for the one upper MCS level and a receipt SINR.

[4] Process Flow of Frame Data Allocator

Figure 11:
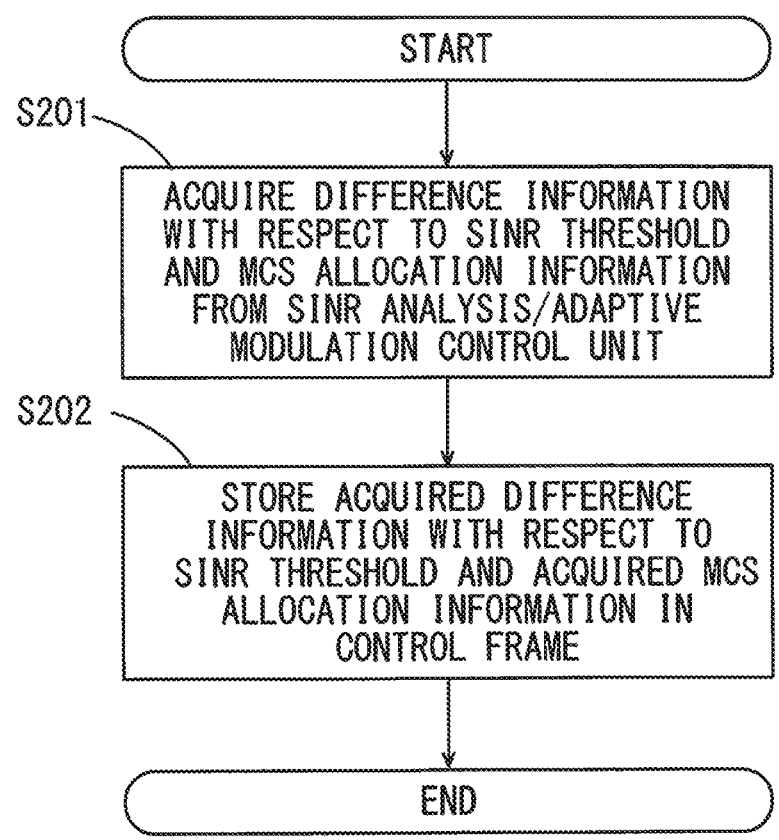
FIG. 11 is a flowchart illustrating the process flow of a frame data allocator.

Next, the process flow of the frame data allocator 110 will be described. FIG. 11 is a flowchart illustrating the process flow of the frame data allocator 110. The frame data allocator 110 acquires the difference information with respect to an SINR threshold and the MCS allocation information from the SINR analysis/Adaptive modulation control unit 108 (step S201). The frame data allocator 110 stores the acquired difference information with respect to an SINR threshold and the acquired MCS allocation information in the control frame (step S202). The frame data allocator 110 generates frame data that includes the data acquired from the upper layer and the control frame storing the difference information with respect to an SINR threshold and the MCS allocation information. The frame data allocator 110 allocates the frame data to each sub-carrier. The frame data allocator 110 outputs a sub-carrier information to the OFDM data allocator 111.

The OFDM allocator 111 modulates and codes each sub-carrier to which the frame data is allocated in a designated MCS level based on the MCS allocation information acquired by the transmission power/MCS control unit 106. Thus, the difference information with respect to an SINR threshold and the MCS allocation information that are stored in the control frame by the frame data allocator 110 are modulated and coded by the OFDM allocator 111. The control frame that is allocated to the sub-carrier, and modulated and coded in the designated MCS level is modulated by the modulator 112 and then transmitted as an OFDM signal. In this manner, the difference information with respect to an SINR threshold and the MCS allocation information are transmitted to the OFDM communication device 100 which functions as the transmitting device from the OFDM communication device 100 which functions as the receiving device.

The transmitted OFDM signal is received by the OFDM communication device 100 that functions as the transmitting device. Then, the control frame included in the OFDM signal is extracted by the frame data extractor 105 and output to the power adjustment/MCS allocation information extraction unit 107. In this manner, the difference information with respect to an SINR threshold that is calculated and the MCS allocation information that is determined by the SINR analysis/Adaptive modulation control unit 108 of the OFDM communication device 100 that functions as the receiving device are extracted by the power adjustment/MCS allocation information extraction unit 107 of the OFDM communication device 100 that functions as the transmitting device.

[5] Process Flow of Power Adjustment/MCS Allocation Information Extraction Unit

Figure 12:
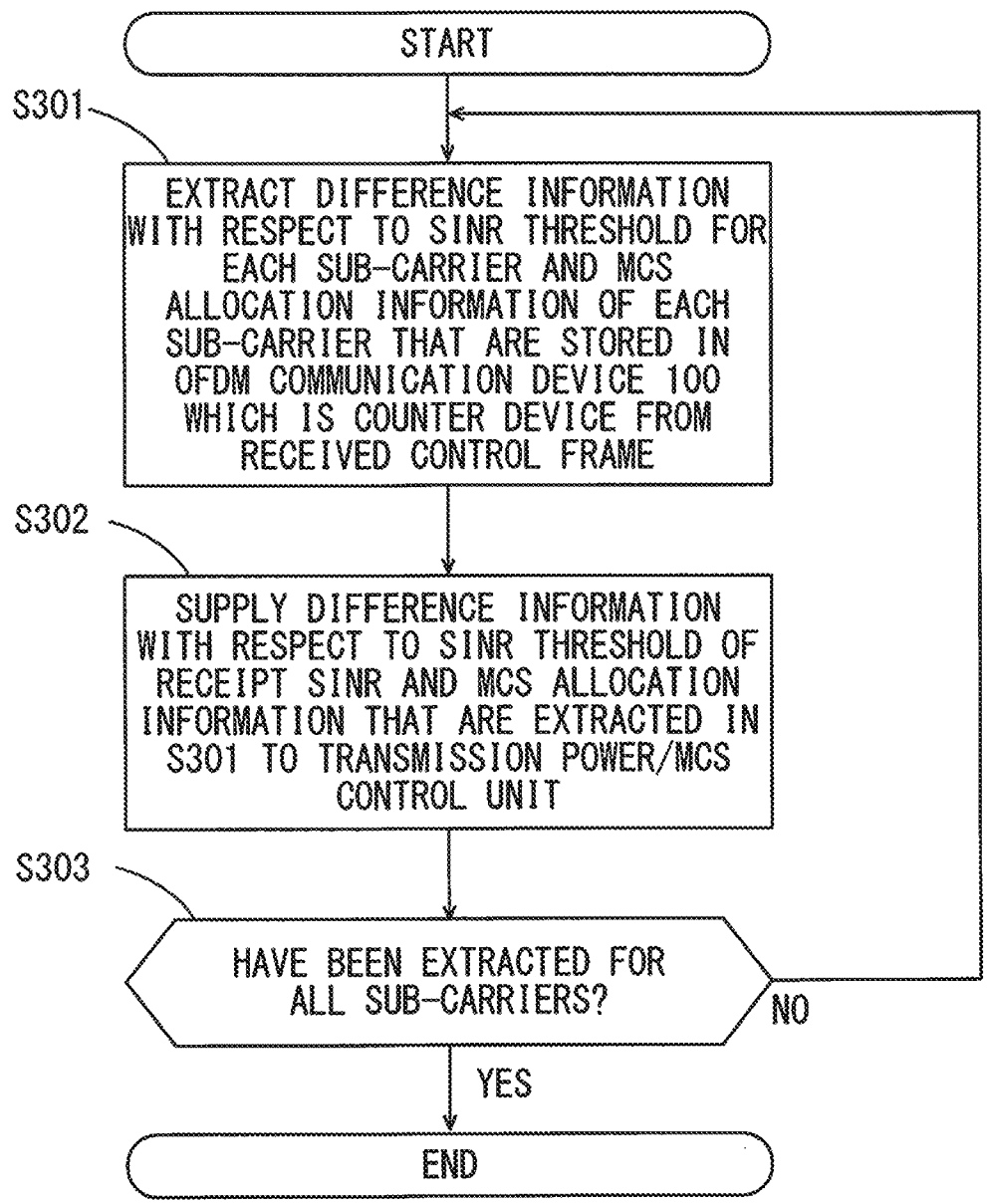
FIG. 12 is a flowchart illustrating the process flow of a power adjustment/MCS allocation information extraction unit.

Next, the process flow of the power adjustment/MCS allocation information extraction unit 107 will be described. FIG. 12 is a flowchart illustrating the process flow of the power adjustment/MCS allocation information extraction unit 107. The power adjustment/MCS allocation information extraction unit 107 acquires the control frame that is extracted from the OFDM receipt signal by the frame data extractor 105. Then, the power adjustment/MCS allocation information extraction unit 107 extracts the difference information with respect to an SINR threshold for each sub-carrier and the MCS allocation information of each sub-carrier that are stored by the OFDM communication device 100 which is the counter device from the received control frame (step S301). That is, as described above, the difference information with respect to an SINR threshold that is calculated and the MCS allocation information that is determined by the SINR analysis/Adaptive modulation control unit 108 which functions as the receiving device is acquired by the OFDM communication device 100 that functions as the transmitting device.

Next, the power adjustment/MCS allocation information extraction unit 107 supplies the difference information with respect to an SINR threshold and the MCS allocation information that are extracted in the step S301 to the transmission power/MCS control unit 106 (step S302). The power adjustment/MCS allocation information extraction unit 107 performs the process of the step S302 for all of the sub-carriers. The power adjustment/MCS allocation information extraction unit 107 determines whether the difference informations with respect to SINR threshold and the MCS allocation informations in regard to all of the sub-carriers have been extracted (step S303). In a case where the difference informations with respect to an SINR threshold value and the MCS allocation informations in regard to all of the sub-carriers have not been extracted, the process returns to the step S301, and the process of the steps S301 and S302 is repeated for the next sub-carrier. In a case where the difference information with respect to an SINR threshold and the MCS allocation information in regard to all of the sub-carriers have been extracted, the process ends.

[6] Process Flow of Transmission Power/MCS Control Unit

Figure 13:
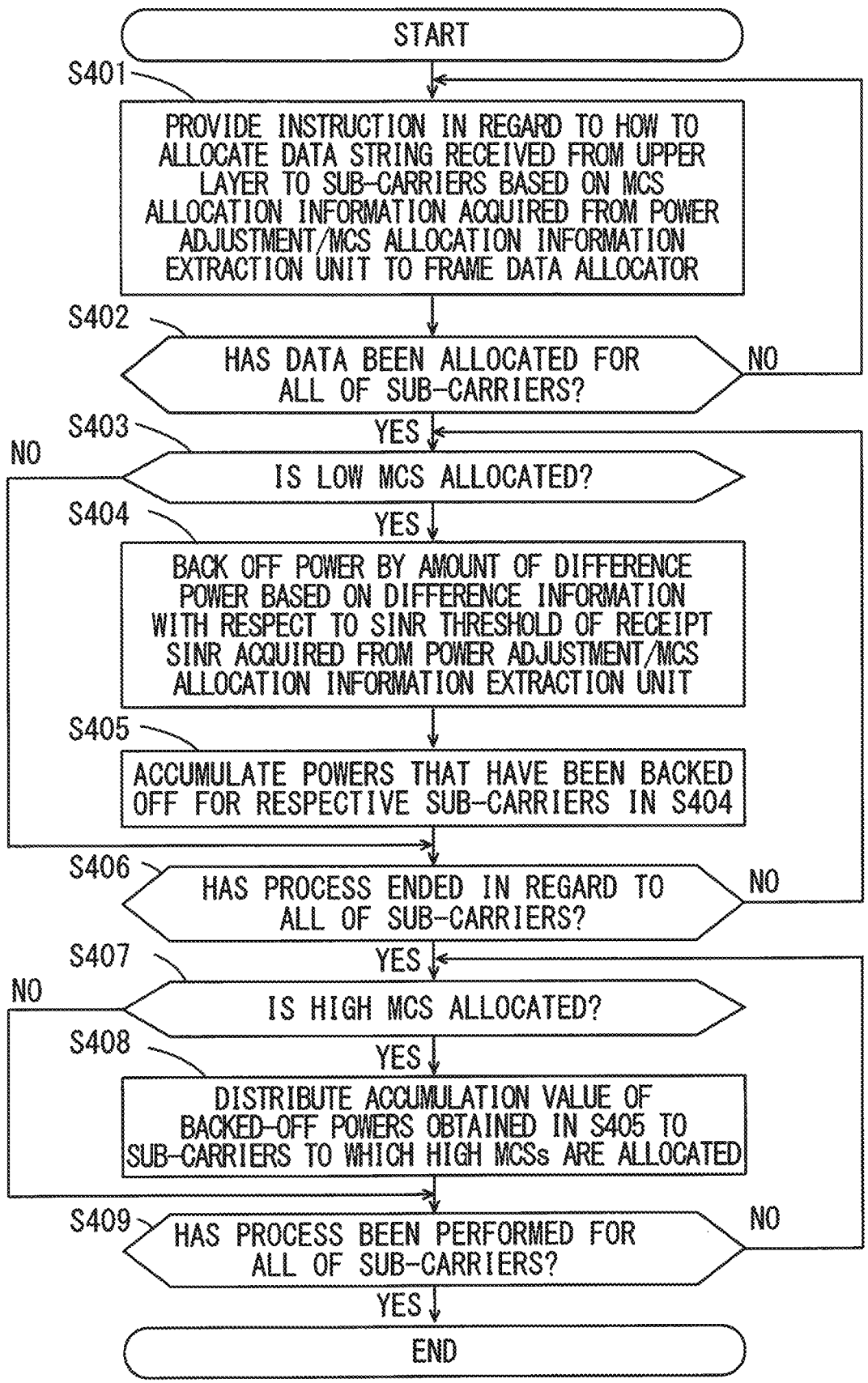
FIG. 13 is a flowchart illustrating the process flow of a transmission power/MCS control unit.

Next, the process flow of the transmission power/MCS control unit 106 will be described. FIG. 13 is a flowchart illustrating the process flow of the transmission power/MCS control unit 106. The transmission power/MCS control unit 106 allocates an MCS to each sub-carrier based on the MCS allocation information acquired from the power adjustment/MCS allocation information extraction unit 107. Specifically, the transmission power/MCS control unit 106 supplies the MCS allocation information to the OFDM data allocator 111 and sets an MCS for each sub-carrier. That is, an MCS is allocated to each sub-carrier by the OFDM communication device 100 which functions as the transmitting device in accordance with the MCS allocation information stored by the OFDM communication device 100 that functions as the receiving device. Further, the transmission power/MCS control unit 106 provides an instruction in regard to how to allocate the data received from the upper layer to sub-carriers to the frame data allocator 110 (step S401). The frame data allocator 110 allocates the data received from the upper layer to each sub-carrier based on the instruction provided by the transmission power/MCS control unit 106.

The transmission power/MCS control unit 106 determines whether the process of allocating data to all of the sub-carriers has been performed (step S402). In a case where the process of allocating data to all of the sub-carriers has not been completed, the process returns to the step S401, and the process of the step S401 is repeated for the next sub-carrier. In a case where the process of allocating data has been completed for all of the sub-carriers, the process of the transmission power/MCS control unit 106 proceeds to the step S403.

Next, the transmission power/MCS control unit 106 performs the process of the steps S403 to S406 for each sub-carrier. First, the transmission power/MCS control unit 106 determines whether a low MCS is allocated to a sub-carrier to be processed (step S403).

Here, a low MCS is an MCS having a low coding rate. For example, in a case where MCSs include five coding schemes of 256 QAM, 64 QAM, 16 QAM, QPSK and BPSK, low MCSs indicate QPSK, BPSK and the like. Which MCSs are to be classified as the low MCSs may be sellable by a user. Alternatively, the low MCSs may be determined from among all of the MCSs by the Water Filling Principle.

Next, the transmission power/MCS control unit 106 backs off the transmission power for the sub-carrier to which a low MCS is allocated by the amount corresponding to the difference information based on the difference information with respect to an SINR threshold that is acquired from the power adjustment/MCS allocation information extraction unit 107 (step S404).

Figure 15:
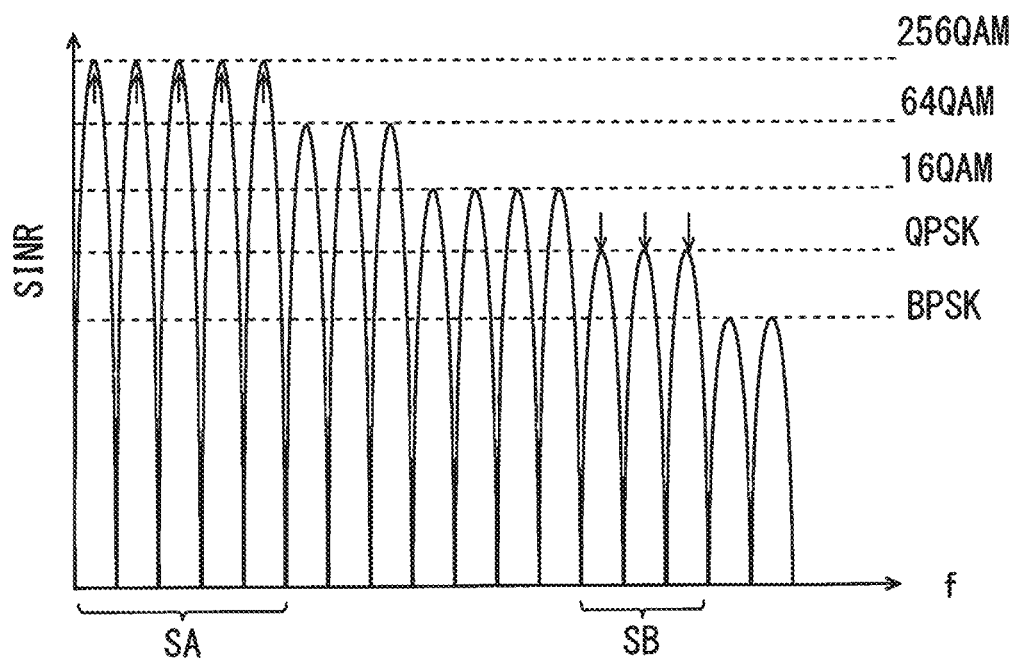
FIG. 15 is a diagram illustrating an SINR after a transmission power is boosted or backed off for each sub-carrier.

FIG. 15 is a diagram illustrating SINRs after a transmission power is boosted or backed off for each sub-carrier. In FIG. 15, the transmission power for a sub-carrier in the frequency range SB illustrates the transmission power that is backed off by the amount corresponding to the difference information. A sub-carrier in the frequency range SB in FIG. 14 illustrates the sub-carrier before the transmission power is backed off, and a sub-carrier in the frequency range SB in FIG. 15 illustrates an information after a transmission power is backed off. In this manner, as for a sub-carrier in the frequency range SB, a transmission power is backed off to an SINR threshold requested for QPSK which is an allocated MCS. That is, in the state illustrated in FIG. 14, as for the frequency range SB, a transmission power is wasted in an amount of the difference between an SINR threshold requested for QPSK which is the allocated MCS and a receipt SINR. As such, as illustrated in FIG. 15, a transmission power is backed off to an SINR threshold requested for QPSK which is the allocated MCS, whereby the transmission power can be distributed to another sub-carrier.

Next, the transmission power/MCS control unit 106 accumulates the amounts of transmission powers that have been backed off for respective sub-carriers in the step S404 (step S405). The transmission power/MCS control unit 106 determines whether the process has ended for all of the sub-carriers (step S406). In a case where the process has not ended for all of the sub-carriers, the process returns to the step S403, and the process for the next sub-carrier is performed. Then, in a case where a low MCS is allocated to the next sub-carrier to be processed, a transmission power is backed off, and the amount of transmission powers that have been backed off in the step S404 are repeatedly accumulated. In a case where the process has been ended for all of the sub-carriers, the process of the transmission power/MCS control unit 106 proceeds to the step S407.

Next, the transmission power/MCS control unit 106 performs the process of the steps S407 to S409 for each sub-carrier. The transmission power/MCS control unit 106 first determines whether a high MCS is allocated to a sub-carrier to be processed (step S407).

Here, a high MCS refers to an MCS having a high coding rate. For example, in a case where the MCSs include five coding schemes of 256 QAM, 64 QAM, 16 QAM, QPSK and BPSK, the high MCSs indicate 256 QAM, 64 QAM, 16 QAM and so on. Which MCSs are to be classified as high MCSs may be settable by the user. Alternatively, as described above, high MCSs and low MCSs may be determined from among all of the MCS by the Water Filling Principle.

Then, the transmission power/MCS control unit 106 distributes the accumulation value of the backed-off transmission powers obtained in the step S405 to the sub-carriers to which high MCSs are allocated (step S408).

FIG. 15 is a diagram illustrating an SINR alter a transmission power is boosted or backed off for each sub-carrier. FIG. 15 illustrates the transmission powers corresponding to the difference informations being boosted in regard to the sub-carriers in the frequency range SA. FIG. 14 illustrates the SINRs before the transmission powers are boosted for the sub-carriers in the frequency range SA, and FIG. 15 illustrates the SINRs after the transmission powers are boosted for the sub-carriers in the frequency range SA. In this manner, as for the sub-carriers in the frequency range SA, the transmission powers are boosted to the SINR thresholds for 256 QAM which is one upper MCS level from 64 QAM which is the allocated MCS. Thus, in the frequency range corresponding to high SINRs, communication can be carried out at a higher coding rate.

The transmission power/MCS control unit 106 determines whether the process has been performed for all of the sub-carriers (step S409). In a case where the process has not ended for all of the sub-carriers, the process returns to the step S407, and the process is performed for the next sub-carrier. Then, in a case where a high MCS is allocated to the next sub-carrier to be processed, a transmission power is boosted. In a case where the process has ended for all of the sub-carriers, the process of the transmission power/MCS control unit 106 ends.

Figure 16:
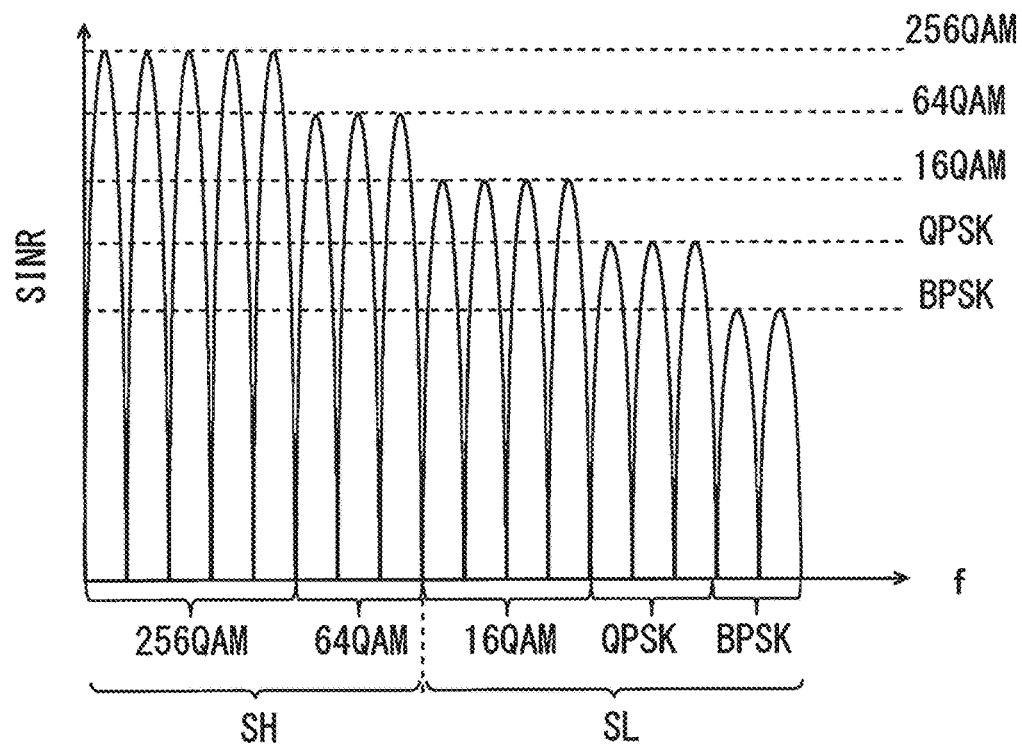
FIG. 16 is a diagram illustrating the allocation of an MCS after a transmission power is boosted or backed off for each sub-carrier.

FIG. 16 is a diagram illustrating the allocation of an MCS after a transmission power is boosted or backed off for each sub-carrier. In the example of FIG. 16, 16 QAM, QPSK and BPSK are classified as the low MCSs. In FIG. 16, transmission powers are backed off for 16 QAM, QPSK and BPSK which are the low MCSs. That is, in regard to 16 QAM, QPSK and BPSK, the transmission powers are backed off to the SINR thresholds requested for the allocated MCSs. In FIG. 14, in regard to the sub-carriers illustrated as being in the frequency range SL, the sub-carriers are classified as the low MCSs, and the transmission powers corresponding to the difference informations are backed off. Then, the accumulation value of the transmission powers that have been backed off for the sub-carriers illustrated as being in the frequency range SL is allocated to high MCSs. In the example illustrated in FIG. 16, part of the sub-carriers to which 16 QAM is allocated as illustrated in FIG. 14 is classified as the low MCSs. That is, the boundary between the high MCSs and the low MCSs is provided in the frequency band of the sub-carriers allocated to 16 QAM, by way of example.

In FIG. 16, the transmission powers are boosted for not less than 64 QAM which are the high MCSs. In FIG. 16, the sub-carriers illustrated as being in the frequency range SH are classified as the high MCSs, and the transmission powers corresponding to the difference informations are boosted. In a case where there is a regulation in regard to a total transmission power, transmission powers can be boosted for the frequency region SH by the accumulation value of the transmission powers that are backed off for the frequency range SL. To which sub-carrier in the frequency range SH the transmission power is preferentially allocated may be suitably settable by the user. In the example illustrated in FIG. 16, part of the sub-carriers among the sub-carriers to which 16 QAM is allocated as illustrated in FIG. 14 is classified as the high MCSs. As described above, in the example of FIG. 16, the boundary between the high MCSs and the lower MCSs is provided in the frequency band of the sub-carriers allocated to 16 QAM.

Figure 19:
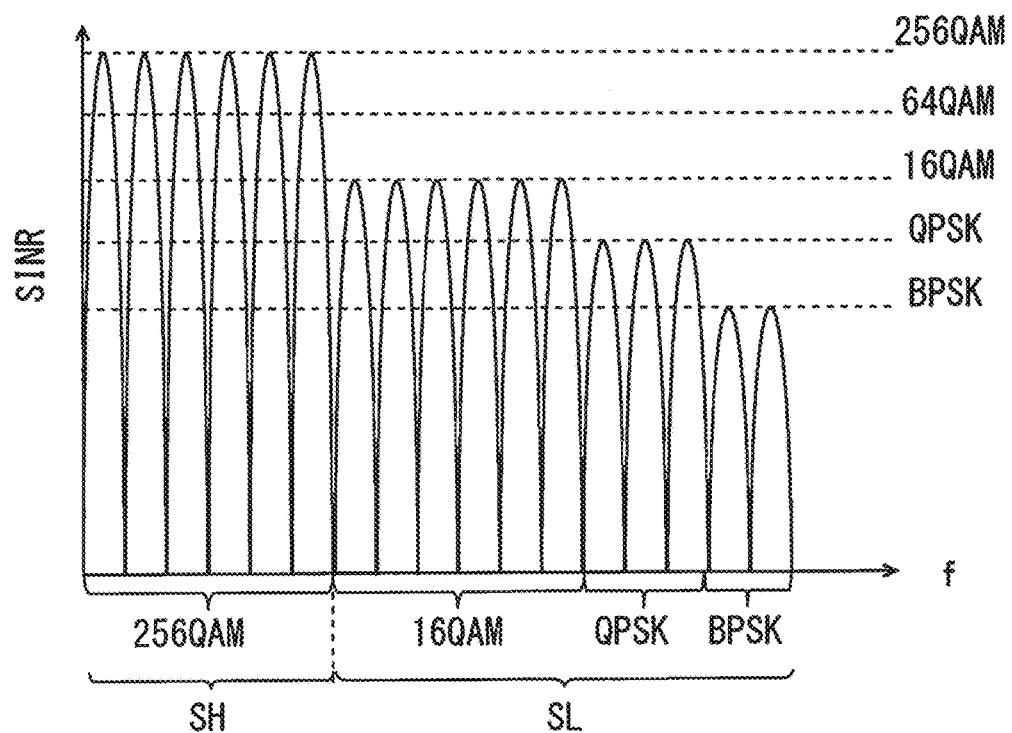
FIG. 19 is a diagram illustrating the allocation of an MCS after a transmission power is boosted or backed off for each sub-carrier.

FIG. 19 is a diagram illustrating allocation of the MCSs after the transmission powers of the sub-carriers illustrated in FIG. 14 are boosted or backed off with the boundary set in the frequency range different from the frequency range set in FIG. 16. FIG. 19 is an example where high MCSs and low MCSs are classified based on an originally allocated MCS unit. In the example of FIG. 19, as for the sub-carriers illustrated as being in the frequency range SL, the sub-carriers are classified as the low MCSs, and the transmission powers corresponding to the difference informations are backed off. On the other hand, as for the sub-carriers illustrated as being in the frequency range SH, the sub-carriers are classified as the high MCSs, and the transmission powers corresponding to the difference informations are boosted. Specifically, in FIG. 14, the transmission powers are backed off for the sub-carriers to which 16 QAM is allocated, that are, the sub-carriers having the SINRs that are the values between the threshold value of 16 QAM and the threshold value of 64 QAM. The process of the flowchart illustrated in FIG. 13 is an inventive example where the transmission powers are boosted or backed off as illustrated in FIG. 19.

In this manner, in the step S401, the transmission power/MCS control unit 106 first determines an MCS for each sub-carrier based on the acquired MCS allocation information. That is, an MCS is determined for each sub-carrier based on the MCS allocation information recommended by the OFDM communication device 100 which functions as the receiving device. The transmission power/MCS control unit 106 further boosts the transmission powers for the high MCSs in the step S408. Thus, in regard to the high MCSs, the transmission power/MCS control unit 106 allocates an MCS that is one level higher than the MCS that is designated based on the MCS allocation information recommended by the OFDM communication device 100 that functions as the receiving device.

[7] Summary of Communication System of Embodiment

The gist of the transmission power (electric power) adjustment and adaptive modulation for the sub-carriers in the communication system 50 according to the above-described present embodiment is as follows. The adjustment of transmission powers for sub-carriers (A), SINR adaptation (B) and Dynamic AMC (C), described below, are performed alone or in combination.

(A) Adjustment of Transmission Powers for Sub-Carriers

<a> The receiving device detects a first sub-carrier having a first SINR which is smaller than a first SINR threshold for a first MCS;

<b> The receiving device detects a second sub-carrier having a second SINR which is larger than a second SINR threshold for a second MCS;

<c> The transmitting device increases a transmission power (boost) for the first sub-carrier so that the first SINR reaches the first SINR threshold;

<d> The transmitting device decreases a transmission power (back off) for the second sub-carrier so that the second SINR reaches the second SINR threshold; and <e> The transmitting device allocates the first MCS to the first sub-carrier.

Here, the first (second) SINR threshold for the first (second) MCS is a threshold value of SINR for satisfying a supplied target BER in a case where communication using multi-carrier modulation is carried out in the first (second) MCS.

In the above-mentioned procedure of <c>, the frequency of the first sub-carrier is smaller than that of the second sub-carrier. On the contrary, the frequency of the first subcarrier may be larger than that of the second sub-carrier.

Further, in the above-mentioned embodiment, the process of <d> is performed first, so that a transmission power for the second sub-carrier is backed off. Subsequently, the process of <c> is performed, so that a transmission power for the first sub-carrier is boosted. At this time, the transmission power for the second sub-carrier is backed off, so that a remaining transmission power is assigned to the first sub-carrier. In a case where the transmission powers for a plurality of sub-carriers that are classified as the second sub-carrier are backed off, the amounts of the transmission powers that are backed off are accumulated. Then, the accumulated transmission power is assigned to the transmission power for the first sub-carrier. In a case where the transmission powers for the plurality of sub-carriers that are classified as the first sub-carrier are boosted, the accumulated transmission power is assigned to the plurality of these sub-carriers. Thus, even in a case where there is a regulation in regard to a total transmission power, the transmission powers for the low MCSs and the high MCSs can be adjusted in a range of the total transmission power.

Each MCS needs a lower limit value of SINR (SINR threshold) which achieves a target BER which satisfies a desired transmission property. Due to a frequency change of the wired transmission line, SINRs of most of sub-carriers have gaps from SINR thresholds corresponding to applicable MCSs. The receiving device detects a gap between an actual SINR and an SINR threshold in regard to each sub-carrier. Then, the transmitting device redistributes the gap in each sub-carrier by boosting or backing off the transmission power so that the high-performance MCS is assigned to a sub-carrier with a high receiving property. Thus, the applicable MCS is raised to one upper MCS level (e.g. 64 QAM to 256 QAM). As a result, a high transmission property is achieved.

As described above, which sub-carriers are set as the low MCSs for backing off of transmission powers, and which sub-carriers are set as the high MCSs for boosting of transmission powers may be sellable by the user. For example, the user sets 256 QAM and 64 QAM as the high MCSs and sets 16 QAM, QPSK and BPSK as the low MCSs. Alternatively, the user sets 256 QAM, 64 QAM and 16 QAM as the high MCSs and sets QPSK and BPSK as the low MCSs. These are merely examples, and the user can freely set the boundary between high MCSs and low MCSs.

As the technique for distributing an electric power, the Water Filling Principle that maximizes the channel capacity by allocation of power in correspondence with the reciprocal of the communication quality (an SINR, for example) of each communication device has been known. That is, high MCSs and low MCSs may be determined using the Water Filling Principle such that the transmission efficiency is optimized by assignment of the accumulation value of the transmission powers that are backed off for the low MCSs to the high MCSs.

Further, while 256 QAM, 64 QAM, 16 QAM, QPSK and BPSK are listed as examples of MCSs in the present embodiment, these are merely examples. The other MCSs may be used as a matter of course.

(B) SINR Adaptation

<a> The receiving device estimates an SINR for each sub-carrier;

<b> The receiving device allocates a suitable MCS to each sub-carrier; and

<c> The receiving device sends an information of the MCS allocated to the transmitting device.

The OFDM communication device 100 that functions as the receiving device estimates an SINR for each sub-carrier. Then, the OFDM communication device 100 that functions as the receiving device allocates an MCS that satisfies a target BER for each sub-carrier based on a known receiving property of the local device. The OFDM communication device 100 transmits an MCS allocation information to the OFDM communication device 100 that functions as the transmitting device. Thus, the OFDM communication device 100 that functions as the transmitting device sets an MCS for each sub-carrier based on the received MCS allocation information. Thus, the most suitable MCS corresponding to a receipt SINR is determined among the OFDM communication devices 100. In a case where a plurality of OFDM communication devices 100 constitute a communication system, the most suitable MCS is determined based on the SINRs among the two OFDM communication devices 100 that actually carry out communication. Even in a case where an OFDM communication device 100 having a poor receiving property and a low SINR is present in the communication system 50, the low SINR does not affect the entire communication system 50.

(C) Dynamic AMC (Adaptive Modulation and Coding)

The OFDM communication device 100 that functions as the receiving device allocates an appropriate MCS to the boosted or backed-off sub-carrier in response to the receiving property of the local device (OFDM communication device 100) and/or a change of frequency property in the wired transmission line 101. That is, a transmission power for the sub-carrier is boosted or backed off dynamically in response to a transmission line property with the counter device, and a most suitable MCS is set. It is not necessary to adjust devices and transmission schemes after installation of the OFDM communication devices 100, and an effective transmission property is achieved.

[8] Other Embodiments

In the above-mentioned embodiment, each function element of the OFDM communication device 100 illustrated in FIG. 9, that is, the hybrid unit 102, the demodulator 103, the OFDM data extractor 104, the frame data extractor 105, the transmission power/MCS control unit 106, the power adjustment/MCS allocation information extraction unit 107, the SINR analysis/Adaptive modulation control unit 108, the frame data allocator 110, the OFDM data allocator 111, the modulator 112, a timing generator 113 or the upper layer 120 is constituted by hardware, by way of example. Part or all of the function elements 102 to 108, 110 to 113 and 120 may be realized by software as another configuration.

Figure 17:
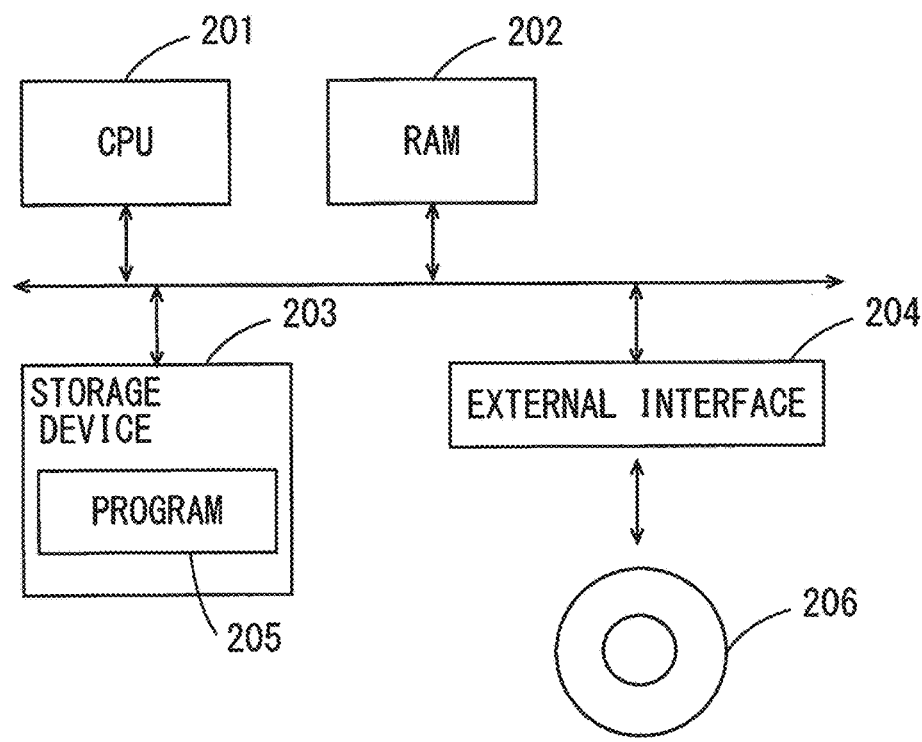
FIG. 17 is a block diagram of an embodiment in which an OFDM communication device is constituted by software.
Figure 18:
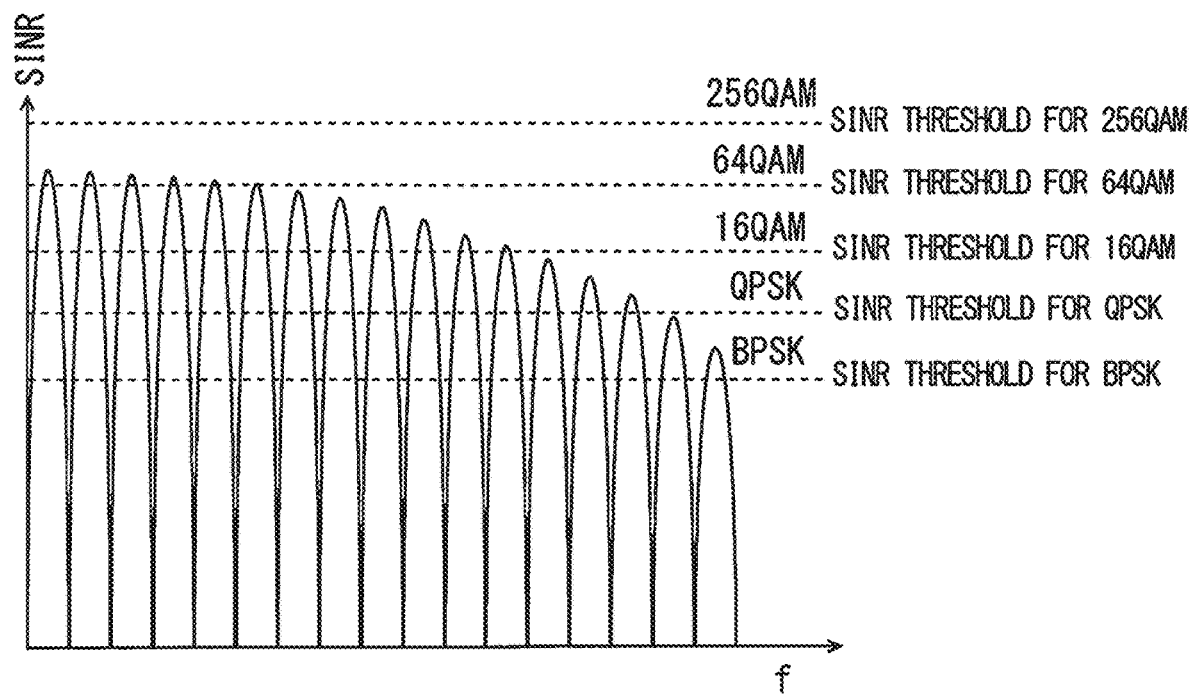
FIG. 18 is a diagram illustrating an SINR threshold for each MCS.

In a case where part or all of the function elements 102 to 108, 110 to 113 and 120 are realized by software, the OFDM communication device 100 is constituted by a CPU (Central Processing Unit) 201, a RAM (Random Access Memory) 202, a storage device 203 and an external interface 204 as illustrated in FIG. 17.

The storage device 203 includes a program 205. The program 205 is a program that can implement part or all of the function elements 102 to 108, 110 to 113 and 120 illustrated in FIG. 9. The CPU 201 executes the program 205 using hardware resources such as a RAM 202, thereby being capable of realizing part or all of the function elements 102 to 108, 110 to 113 and 120 illustrated in FIG. 9. A hard disc, a ROM (Read Only Memory) or the like is used as the storage device 203. Further, the program 205 may be stored in a storage medium 206 via the external interface 204.

In the above-mentioned embodiment, the OFDM communication device 100 of the present embodiment is provided in the vehicle 5, by way of example. While an object in which the OFDM communication device 100 of the present embodiment is to be provided is not limited in particular, the OFDM communication device 100 is particularly effective in a case where being used in a vehicle that includes a motor such as an engine and generates noise such as an automobile or a vehicle including a motor.

[9] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the OFDM communication device 100 is an example of a transmitting device and a receiving device. In the above-mentioned embodiment, the SINR analysis/Adaptive modulation control unit 108 is an example of an estimator and an allocator. In the above-mentioned embodiment, the transmission power/MCS control unit 106 is an example of a power adjustor. In the above-mentioned embodiment, the frame data allocator 110, the OFDM data allocator 111, the modulator 112 and the hybrid unit 102 are examples of a transmitter.

Although the embodiment of the present invention has been described with reference to specific drawings and described in the foregoing description, it will be understood that the present invention is not limited to the embodiment disclosed, but is capable of numerous rearrangements, modifications and substitutions without departing from the spirit of the invention as set forth and defined by the following claims.

The invention claimed is:

1. A communication system that uses a wired transmission line and multi-carrier modulation, comprising a transmitting device and a receiving device that are connected to each other through the wired transmission line, wherein
the receiving device includes an estimator configured to estimate a first SINR (Signal-to-Interference-Plus-Noise Ratio) of a first sub-carrier and a second SINR of a second sub-carrier,
the transmitting device includes a power adjustor configured to set a first MCS (Modulation and Coding Scheme) and a second MCS among a plurality of MCSs, boost a transmission power for the first sub-carrier such that an SINR of the first sub-carrier reaches a first SINR threshold corresponding to the first MCS that is larger than the first SINR, and back off a transmission power for the second sub-carrier such that an SINR of the second sub-carrier is lowered to a second SINR threshold corresponding to the second MCS that is smaller than the second SINR, and
the transmitting device allocates the first MCS to the first sub-carrier with keeping allocation of the second MCS to the second sub-carrier,
wherein a whole frequency range is divided into a first frequency range and a second frequency range by a boundary, the first sub-carrier belonging to the first frequency range and the second sub-carrier belonging to the second frequency range.

2. The communication system that uses the wired transmission line and the multi-carrier modulation according to claim 1, wherein
the power adjustor backs off the transmission power for the second sub-carrier and then boosts the transmission power for the first sub-carrier, thereby allocating the backed-off transmission power for the second-sub-carrier to the first sub-carrier.

3. The communication system that uses the wired transmission line and the multi-carrier modulation according to claim 1, wherein
the power adjustor backs off transmission powers for a plurality of the second sub-carriers which exceeds the second SINR threshold, then accumulates the backed-off transmission powers for the plurality of the second sub-carriers and boosts transmission powers for one or a plurality of the first sub-carriers, thereby allocating an accumulation value of the backed-off transmission powers for the plurality of the second sub-carriers to the one or plurality of the first sub-carriers.

4. The communication system that uses the wired transmission line and the multi-carrier modulation according to claim 3, wherein
the transmitting device is configured allocate the first MCS to the first sub-carrier without deactivating any of the plurality of the second sub-carriers belonging to the second frequency range.

5. The communication system that uses the wired transmission line and the multi-carrier modulation according to claim 1, wherein
the plurality of MCSs include at least one modulation and coding scheme selected from a group consisting of 256 QAM, 64 QAM, 16 QAM, QPSK and BPSK.

6. The communication system that uses the wired transmission line and the multi-carrier modulation according to claim 5, wherein
the transmitting device is configured to set at least one first MCS as an upper MCS and at least one second MCS as a lower MCS among the plurality of MCSs.

7. The communication system that uses the wired transmission line and the multi-carrier modulation according to claim 6, wherein
the transmitting device is configured to set the at least one first MCS and the at least one second MCS based on transmission property of the wired transmission line.

8. The communication system that uses the wired transmission line and the multi-carrier modulation according to claim 1, wherein
the receiving device includes
an allocator configured to allocate the MCS which satisfies a target Bit Error Rate (BER) to each sub-carrier based on an SINR estimated in regard to each sub-carrier, and
a transmitter configured to transmit an allocation information of the MCS that is allocated to each sub-carrier to the transmitting device.

9. The communication system that uses the wired transmission line and the multi-carrier modulation according to claim 1, wherein
the transmitting device dynamically boosts the transmission power for the first sub-carrier.

10. The communication system that uses the wired transmission line and the multi-carrier modulation according to claim 1, wherein
the transmitting device dynamically backs off the transmission power for the second sub-carrier.

11. The communication system that uses the wired transmission line and the multi-carrier modulation according to claim 1, wherein
the wired transmission line, the receiving device and the transmitting device are provided in an automobile or a vehicle with a motor.

* * * * *